United States Patent
Schaedeli et al.

(10) Patent No.: US 6,280,511 B1
(45) Date of Patent: Aug. 28, 2001

(54) MICROBEADS CONSISTING OF A PIGMENTED POLYMERIC MATERIAL AND PROCESS FOR PREPARING THEM

(75) Inventors: Ulrich Schaedeli, Plasselb; Patrice Bujard, Reinach, both of (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 09/428,102

(22) Filed: Oct. 27, 1999

Related U.S. Application Data

(60) Provisional application No. 60/106,146, filed on Oct. 29, 1998.

(51) Int. Cl.⁷ .............................. C09D 11/00; G03G 9/00; B32B 15/02
(52) U.S. Cl. ................... 106/31.33; 524/82; 524/86; 524/88; 524/92; 524/96; 524/107; 428/304.4; 428/402.21; 428/402.22; 430/109; 430/111; 106/31.13; 106/31.27; 106/31.28
(58) Field of Search ............................. 524/88, 92, 96, 524/86, 82, 107; 428/304.4, 402.21, 402.22; 430/109, 111; 106/31.13, 31.27, 31.28, 31.33

(56) References Cited

U.S. PATENT DOCUMENTS

| | | | |
|---|---|---|---|
| 4,597,794 | 7/1986 | Ohta et al. ............................. | 106/20 |
| 4,806,360 | 2/1989 | Leong et al. ........................... | 424/487 |
| 4,975,220 | 12/1990 | Streitel et al. ................... | 252/301.35 |
| 5,085,698 | 2/1992 | Ma et al. ............................... | 106/20 |
| 5,231,117 | 7/1993 | Seitz ..................................... | 523/161 |
| 5,484,943 | 1/1996 | Zambounis et al. .................. | 548/453 |
| 5,615,725 | 4/1997 | Ming-Shun ..................... | 160/370.22 |
| 5,629,367 | 5/1997 | Lofftus et al. ......................... | 524/88 |
| 5,712,068 | 1/1998 | Dalal et al. ........................... | 430/106 |

FOREIGN PATENT DOCUMENTS

| | | |
|---|---|---|
| 0 654 711 | 5/1995 | (EP) . |
| 0 761 772 | 3/1997 | (EP) . |
| 98/32802 | 7/1998 | (WO) . |
| 98/58027 | 12/1998 | (WO) . |

OTHER PUBLICATIONS

Abst. Page for EP 0 761 772.

*Primary Examiner*—Samuel A. Acquah
(74) *Attorney, Agent, or Firm*—David R. Crichton

(57) ABSTRACT

A microbead comprising at least one thermoplastic polymers having distributed one or more compounds which are pigment precursors, the melting temperature of the lowest-melting polymer of the microbead being at least higher than the lowest temperature required to transform all pigment precursors in the microbead into the respective pigments.

5 Claims, No Drawings

MICROBEADS CONSISTING OF A PIGMENTED POLYMERIC MATERIAL AND PROCESS FOR PREPARING THEM

This Application claims benefit of Provisional Application Ser. No. 60/106,146 filed Oct. 29, 1998.

The present invention relates to latently pigmented microbeads formed of a polymeric material, to preferred types of processes for preparing such microbeads, to processes for preparing pigmented microbeads starting from the latently pigmented microbeads and to color toners for electrophotographic printing techniques and inks for ink jet printing.

Latently pigmented polymeric organic materials are already known. Coating compositions based thereon are, for instance, described in EP-A-0 654 711. A latently pigmented material has one or more pigment precursor (also called "a latent pigment" being uniformly dispersed therein. A pigment precursor is defined as a derivative of an organic pigment comprising a sufficient number of solubilizing chemical groups to render the derivative soluble in certain solvents. These solubilizing groups of the pigment precursor can be split off again by applying heat and/or by contacting the precursor with a Broensted acid, thereby re-forming the insoluble pigment from which the precursor has been derived.

Small sized polymeric particles, in particular corresponding microbeads, having on average a diameter of 1000 microns or less which are formed of thermoplastic polymers and comprise high concentrations of organic pigments are also known, and have become of great interest in many fields of technique during the recent years, for instance, for the production of inks, lubricants, paints, cosmetics or as pharmaceutical carriers. Such microbeads are particularly useful as color toners for electrophotographic printing techniques.

The methods known in the prior art for the production of small sized polymeric particles comprising pigments distributed throughout their mass usually include steps for reducing the pigment particles to a suitable small size and for distributing these pigment particles throughout the polymeric material. Size reduction and distribution are generally carried out by grinding or milling techniques. The pigment/polymer mixtures obtained thereby may, for instance, be melt-homogenized thereafter to obtain a pigmented bulk polymer material. This material must be comminuted again to form pigmented polymeric particles of the desired small size. Processes like these have several disadvantages, for instance, the grinding and milling procedures are highly energy consuming and the pigmented polymer particles obtained by a mechanical comminution are rather sharp-edged and not of a substantially spherical shape. A spherical shape of the particles is however desirable for many uses because this is an essential requirement the compositions to which they are added are to display good flow characteristics and a low viscosity.

Pigmented polymer particles of a more spherical shape and comprising sub-micron sized pigment particles can be provided if more sophisticated preparation methods are used. U.S. Pat. No. 5,629,367, for instance, describes a method for making pigment concentrate particles of a controlled morphology and particle size. However, the process is rather complicated and requires six essential steps, even when the pigment material is already of a suitable size: (1) dispersing the sub-micron sized pigment particles in a pigment dispersing liquid to form a first dispersion phase; (2) blending the first dispersion phase with a polymeric binder to produce a second dispersion phase; (3) mixing the second dispersion phase under sufficient shear to produce a suspension of small dispersion phase droplets in an immiscible suspending liquid; (4) allowing the small dispersion phase droplets in the suspension to coalesce to a larger size at which substantially no further coalescence can occur; (5) mixing the suspension of coalesced droplets with an extracting liquid to remove the pigment dispersant liquid from that coalesced droplets; and (6) isolating the resulting pigment concentrate particles.

Therefore, it is an objective of the instant invention to provide polymer particles, in particular microbeads of a regularly spherical shape, which are uniformly filled throughout their entire mass with organic pigment particles, particularly of sub-micron size, using a simple process which does not require grinding, milling or any other comparatively energy consuming mechanical procedure.

The instant invention is based on the surprising finding that pigment precursors can very simply be uniformly incorporated into polymer microbeads and can furthermore be transformed into the corresponding pigments without a substantial impact on the shape of the microbeads.

The invention therefore provides thermoplastic polymer microbeads having distributed throughout the polymer one or more compounds which are pigment precursors, the melting temperature of the lowest-melting polymer of the microbeads being higher than the lowest temperature required to transform all pigment precursors within the microbeads into the respective pigments.

The number of thermoplastic polymers in the microbeads is for example from 1 to 12, preferably from 1 to 4. The number of pigment precursors in the microbeads is for example from 1 to 10, preferably from 1 to 3.

In the instant application the term "microbead" means particles which are substantially regularly curved and which are substantially free of sharp edges. Preferably the microbeads have a substantially spherical shape.

The microbeads according to the invention can be transformed into microbeads which are filled throughout their entire mass with the corresponding pigments of sub-micron size by heating the microbeads to a temperature which is below the melting point of the polymers of which they are formed but which is high enough to transform the pigment precursors into the respective pigments. Previously contacting the microbeads with a Broensted acid in a way that the Broensted acid can penetrate the microbeads, generally reduces the temperature needed for transforming the pigment precursor into the pigment. For example, room temperature (15 to 35° C.) is generally sufficient for carrying out the transformation in presence of a Broensted acid if the $pK_a$ value of the acid is below about 3.

The microbeads according to the invention have a diameter of 1000 microns (corresponding to 18 mesh according to the US Bureau of Standards) or less, on average, preferably of 600 microns (30 mesh) or less, in particular of 250 microns (60 mesh) or less, for example about 40 microns (400 mesh). The microbeads can also be smaller. For instance, microbeads having, on average, a diameter of 0.05 to 40, in particular 1 to 20 or 1 to 10 microns can be used. A particularly preferred embodiment of the microbeads according to the instant invention has, on average, a diameter of 1 to 250 microns, in particular 3 to 180 microns. The average particle diameters can, for instance, be determined by sieving techniques or, particularly in case of diameters below of 40 microns, by scanning electron microscopy.

The microbeads according to the invention may comprise virtually any type of thermoplastic polymer or copolymer, for instance, one or more of the usual and well-known poly(meth)acrylates, including polymethylmethacrylates, polymethylacrylates, polyethylmethacrylates, polyethylacrylates, styrene-methyl(meth)acrylate copolymers, ethylene-methyl(meth)acrylate copolymers, ethylene-ethyl(meth)acrylate copolymers, polyamides, such as polycaprolactam or polyamide-6,6, or polyamide-6,10, polyesters, polycarbonates, polyurethanes, polyethers, polyvinylalcohols and corresponding copolymers, polystyrenes such as SAN, ASA and ABS, e.g. obtained from monomers like styrene itself, acrylonitrile, methylmethacrylate, butadiene, maleic anhydride, α-methyl styrene, divinylbenzene, or with alkyl and chlorine substituted styrenes, as well as blends of polymers like the aforementioned, such as polyester/polyamide (as described e.g. in U.S. Pat. No. 4,975,220).

Polymers having high melting points are normally preferred because they allow a particularly simple, quick and efficient transformation of the pigment precursors into the corresponding pigments at temperatures which are nevertheless well below the melting temperature of the polymeric material of the microbeads so that a substantial softening or sticking of the microbeads can be avoided during the re-pigmentation step. Therefore the microbeads preferably comprise mainly, for instance to an extent of 75 to 100 percent of their total polymer weight, and more preferably entirely, of polymers and/or copolymers having a melting point of more than 60° C., in particular of more than 80° C. or 100° C., and most preferably of more than 150° C. The upper limit of the range for suitable melting points is not critical and is mainly determined by the intended use of the microbeads. The melting temperatures of the polymeric material may, for instance, range up to 250° C., 300° C. or even to 350° C. The melting point of thermoplastic polymers can be determined using different well known methods, for instance by recording a DSC diagram of a sample of the polymeric material over the interesting temperature range which shows a distinct peak in the temperature region around the melting point. For the purposes of the instant invention it is sufficiently exact to consider the temperature at the maximum of this peak as its melting point and to relate the above mentioned numerical values for the melting temperature to this maximum, in particular if the DSC diagram is recorded at a heating rate of 10° C. per minute. More preferably however the polymers of the microbeads are chosen such that the above mentioned numerical values for the melting temperature correspond to the onset of this peak.

The difference between the melting temperature of the lowest-melting polymer of a microbead and the lowest temperature required for transforming all of the pigment precursors which it comprises into the respective pigments is preferably at least 10 to 30° C., more preferably at least 50° C.

The average weight molecular weight of suitable polymers and copolymers [g/mol] ranges preferably from 600 to 100000, particularly from 1000 to 70000. Especially preferred are polymers of an average weight molecular weight between 1000 and 50000.

Copolymers may be random, block or graft copolymers. Suitable copolymers may also comprise both, a hydrophobic and a hydrophilic part.

The hydrophobic part of the copolymers is preferably built up by monomers like styrene or styrene derivatives, for instance styrenes substituted by $C_1$–$C_4$alkyl, vinyl naphthalenes, optionally substituted, for instance, by $C_1$–$C_4$alkyl, vinyl toluenes, aliphatic $C_{12}$–$C_{18}$alkenes, α,β-unsaturated carboxylates of aliphatic alcohols having 8 to 18 carbon atoms, acrylonitrile, vinylidene chloride, α,β-unsaturated carboxylates, vinyl acetate, vinyl chloride, acrylamide, methacrylamide, hydroxyethylmethacrylate, hydroxypropyl, N-methylol acrylamide, N-butoxymethyl acrylamide, etc.

The hydrophilic part of the copolymers may be ionizable and capable of forming salts or it may not be ionizable. It is preferably built up by monomers comprising functional groups selected from hydroxyl groups, carboxylic acid groups, carboxylic acid anhydride groups, carboxylic acid ester groups, carboxylic acid amide groups, sulfonic acid groups, cyanate and isocyanate groups, and polyether groups, particularly polyethylenoxide and/or polypropylene oxide groups. Particularly preferred are monomers comprising carboxylic acid groups, carboxylic acid anhydride or sulfonic acid groups.

Such copolymers are, for instance, disclosed in U.S. Pat. No. 4,597,794; the disclosure of which is considered as being explicitly incorporated by reference into the instant specification.

A further type of copolymers with hydrophobic and hydrophilic parts are AB or ABA block copolymers wherein the A segment is a hydrophobic homopolymer or copolymer of an acrylic monomer having the formula $CH_2\!=\!C(X_p)(Y_p)$, wherein $X_p$ represents a hydrogen atom or methyl, and $Y_p$ represents —$C(O)OR_{p1}$, —$C(O)NR_{p2}R_{p3}$ or cyano, wherein $R_{p1}$ is an alkyl, aryl, or alkylaryl group having 1 to 20 carbon atoms, and $R_{p2}$ and $R_{p3}$ represent a hydrogen atom or an alkyl, aryl, or alkylaryl group having 1 to 9 carbon atoms, said A segment having an average molecular weight of at least about 300 and being substantially water insoluble; and wherein the B segment is a hydrophilic polymer, or a salt thereof, either of an acrylic monomer having the formula $CH_2\!=\!C(X_M)(Y_M)$, wherein $X_M$ represents a hydrogen atom or methyl, and $Y_M$ represents —$C(O)OH$, —$C(O)NR_{M2}R_{M3}$, —$C(O)OR_{M4}NR_{M2}R_{M3}$ or —$C(O)OR_{M5}$, wherein $R_{M2}$ and $R_{M3}$ represent a hydrogen atom or an alkyl, aryl, or alkylaryl group having 1 to 9 carbon atoms, $R_{M4}$ is an alkylene radical having 1 to 5 carbon atoms; and $R_{M5}$ is an alkyl group having 1 to 20 carbon atoms and containing one or more hydroxyl groups or ether groups; or of a copolymer of the said acrylic monomer of formula $CH_2\!=\!C(X_M)(Y_M)$ with an acrylic monomer having the formula $CH_2\!=\!C(X_p)(Y_p)$, where $X_p$ and $Y_p$ are the substituents groups defined for said A segment, said B segment having an average molecular weight of at least about 300 and being water soluble, with the proviso that said B segment constitutes about 10 to 90% of said block copolymer. Such block copolymers are described in more detail in U.S. Pat. No. 5,085,698, the disclosure of which is also considered as an explicit part of the instant specification.

Preferred microbeads are formed of one or more thermoplastic polymer or copolymer of monomers having polymerizable double bonds or of a mixture of such polymers and/or copolymers.

A specifically preferred embodiment of these microbeads is based on a partially crosslinked thermoplastic material, for instance, a copolymer of a monomer mixture comprising at least a first monomer having only one polymerizable double bond and a second monomer which has more than one polymerizable double bond. The second monomer represents a relatively small percentage of the total amount of monomers of such copolymers. The percentage may, for instance, range up to 20 mole percent, and is in particular 0.5 to 10, especially 0.5 to 5 mole percent of all monomers. Preferred examples of such copolymer comprise divinylbenzene as the second monomer, in particular in combination with styrene as the first monomer.

The microbeads of the instant invention preferably comprise a pigment precursor selected from compounds of formula I $$A(B)_x, \quad (I)$$

in which

A represents a residue of a colorant of the anthraquinone, azo, quinacridone, quinophthalone, diketopyrrolopyrrole, dioxazine, indanthrone, indigo, isoindoline, isoindolinone, perylene, or phthalocyanine series, which is linked to x groups B via one or more of its hetero atoms, wherein such hetero atoms are selected from the group consisting of N, O or S, and are part of the molecular structure of A, and B is either a hydrogen atom or a solubilizing group which can be split off by heat and/or a Broensted acid, with the proviso that at least one of the groups B in formula (I) is not a hydrogen atom, and x is an integer from 1 to 8.

Compounds of formula (I) are known, and are, for instance, described in EP-A-0 654 711, EP-A-0 761 772, WO 98/32802 or WO 99/01512. They can be prepared according to known methods for the preparation of such pigment precursors as, for instance, disclosed in U.S. Pat. Nos. 5,484,943 and 5,615,725 by reacting the corresponding pigment with a reactive derivative of the group B, e.g. with a compound of formula B-Cl.

Suitable compounds $A(B)_x$ may contain additional >N—, =N—, —NH— or —NH$_2$ groups. It is not necessary and often not the case, that all the N atoms are linked to groups B. On the other hand, it may as well be that more than one of the groups B may are linked to a single N atom. Preferably, with the exception of phthalocyanines, residue A may also contain at least one carbonyl group either directly bonded to or in conjugation with each of the heteroatoms bonded to the x groups B of the compound of formula (I).

If B means a solubilizing group in formula I which can be split off by heat and/or a Broensted acid, it is preferably and independently of the other groups B selected from the groups represented by the formulae (II), (III), (IV), (IVa), (Va) and (Vb), with the proviso that at least one of the groups B in formula (I) is not a hydrogen atom:

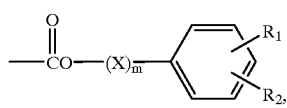
(II)

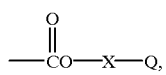
(III)

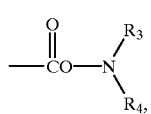
(IV)

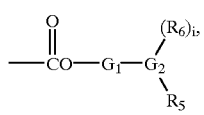
(IVa)

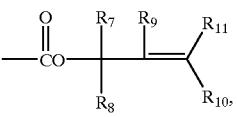
(Va)

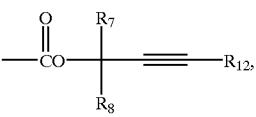
(Vb)

and x is an integer from 1 to 8, such as 1, 2, 3, 4, 5, 6, 7, or 8;

where the symbols used in formulae II, III, IV, IVa, Va and Vb have the following meaning:

$G_1$ represents a p,q—$C_2$–$C_{12}$alkylene, p and q meaning different integers from 1 to 12 therein indicating the positions of the two free valences of the alkylene group, which is furthermore unsubstituted or substituted by one or more of the following substituents $C_1$–$C_{12}$alkyl, $C_1$–$C_{12}$alkoxy, $C_1$–$C_{12}$alkylthio or ($C_1$–$C_{12}$alkyl)$_2$N;

$G_2$ represents an oxygen, sulfur or nitrogen atom;

i is zero, if $G_2$ is an oxygen or sulfur atom, and is 1, if $G_2$ is a nitrogen atom, m is zero or 1, Q is a hydrogen atom; $C_1$–$C_6$alkyl; cyano; $CCl_3$; a group of the formulae

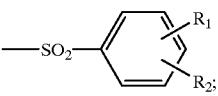

—SO$_2$CH$_3$ or —SCH$_3$, and $R_1$ and $R_2$ each represent, independently from one another, a hydrogen or halogen atom; $C_1$–$C_6$alkyl; $C_1$–$C_6$alkoxy; cyano; nitro; —N($C_1$–$C_6$alkyl)$_2$; or phenyl which is unsubstituted or substituted by a halogen atom, cyano, nitro, $C_1$–$C_6$alkyl or $C_1$–$C_6$alkoxy;

$R_3$ and $R_4$ each represent, independently from one another, a hydrogen atom;

$C_1$–$C_4$alkyl or a group of formula

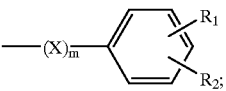

or $R_3$ and $R_4$ together represent pentamethylene;

$R_5$ and $R_6$ each represent, independently from one another, $C_1$–$C_{12}$alkyl or [(p',q'—$C_2$–$C_{12}$alkylene)-$R_{13}$-]$_{ii}$—$C_1$–$C_{12}$alkyl; wherein ii is a number from 1 to 1000, and p' and q' are different integers from 1 to 12 indicating the positions of the free valences of the alkylene group, and wherein $C_2$–$C_{12}$alkylene as well as $R_{13}$ are the same or different in different repeating units of formula [$C_2$–$C_{12}$alkylene-$R_{13}$], and where $R_5$ and $R_6$ are, independently from one another, saturated or one to ten times unsaturated;

uninterrupted or, at arbitrary positions, interrupted by 1 to 10 identical or different groups of the formula —(C=O)— or —$C_6H_4$—, and are unsubstituted or substituted by one or up to ten halogen atoms or cyano or nitro groups;

$R_7$ and $R_8$ each represent, independently from one another, a hydrogen atom; $C_1$–$C_{24}$alkyl; or $C_2$–$C_{24}$alkyl which is interrupted by one or more than one oxygen atom, sulfur atom or ($C_1$–$C_6$alkyl)N-group; furthermore represent $C_2$–$C_{24}$alkenyl; $C_3$–$C_{24}$alkinyl; $C_4$–$C_{12}$cycloalkyl; $C_4$–$C_{12}$cycloalkenyl; or phenyl as well as biphenyl which is unsubstituted or substituted by $C_1$–$C_6$alkyl, $C_1$–$C_6$alkoxy, a halogen atom, cyano or nitro;

$R_9$, $R_{10}$ and $R_{11}$ each represent, independently from one another, a hydrogen atom; $C_1$–$C_{24}$alkyl or $C_2$–$C_{24}$alkenyl;

$R_{12}$ repesents a hydrogen atom; $C_1$–$C_6$alkyl or a group

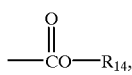

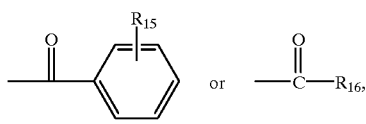

$R_{13}$ represents an oxygen or sulfur atom or ($C_1$–$C_{12}$alkyl)N, $R_{14}$ represents $C_1$–$C_6$alkyl, $R_{15}$ represents a hydrogen atom or $C_1$–$C_6$alkyl, $R_{16}$ represents a hydrogen atom; $C_1$–$C_6$alkyl; or phenyl which is unsubstituted or substituted by $C_1$–$C_6$alkyl, and X is $C_1$–$C_6$alkylene which is unsubstituted or substituted by one of the following residues: $C_1$–$C_{24}$alkyl, $C_2$–$C_{24}$alkyl which is interrupted by one or more than one oxygen atom, sulfur atom or ($C_1$–$C_6$alkyl)N group; $C_3$–$C_{24}$alkenyl; $C_3$–$C_{24}$alkinyl; $C_4$–$C_{12}$-cycloalkyl; $C_4$–$C_{12}$-cycloalkenyl; phenyl or biphenyl which is unsubstituted or substituted by $C_1$–$C_6$alkyl, $C_1$–$C_6$alkoxy, halogen, cyano or nitro.

Alkyl or alkylene may be straight-chain, branched, mono- or polycyclic in the above definition.

Furthermore, $C_1$–$C_{24}$alkyl means e.g. $C_1$–$C_{12}$alkyl, tetradecyl, hexadecyl, octadecyl, eicosyl, dieicosyl or tetraeicosyl.

$C_1$–$C_{12}$alkyl e.g. may be methyl, ethyl, n-propyl, isopropyl, n-butyl, sec.-butyl, isobutyl, tert.-butyl, cyclobutyl, n-pentyl, 2-pentyl, 3-pentyl, 2,2-dimethylpropyl, cyclopentyl, cyclohexyl, n-hexyl, n-octyl, 1,1,3,3-tetramethylbutyl, 2-ethyihexyl, nonyl, trimethylcyclohexyl, decyl, menthyl, thujyl, bornyl, 1-adamantyl, 2-adamantyl or dodecyl, preferably $C_1$–$C_6$alkyl such as methyl, ethyl, n-propyl, isopropyl, n-butyl, sec.-butyl, isobutyl, tert.-butyl, n-pentyl, 2-pentyl, 3-pentyl, 2,2-dimethylpropyl, n-hexyl.

$C_1$–$C_6$alkyl may be, for instance, methyl, ethyl, n-propyl, isopropyl, n-butyl, sec.-butyl, isobutyl, tert.-butyl, n-pentyl, 2-pentyl, 3-pentyl, 2,2-dimethylpropyl (tert.amyl), n-hexyl, preferably $C_1$–$C_4$alkyl such as methyl, ethyl, n-propyl, isopropyl, n-butyl, sec.-butyl, isobutyl, tert.-butyl, and tert.-amyl.

$C_1$–$C_4$alkyl may be methyl, ethyl, n-propyl, isopropyl, n-butyl, sec.-butyl, isobutyl, tert.-butyl, preferably methyl and tert.-butyl.

p',q'—$C_2$–$C_{12}$alkylene means, for instance, one of the exemplified $C_1$–$C_{12}$alkyl radicals except of methyl which has a second free valence on a carbon atom different from that having the other free valence.

ii is preferably an integer from 1 to 100, particularly preferred from 2 to 12.

$C_1$–$C_6$alkylene means, for instance, straight chain or branched alkylene like, for instance, methylene, dimethylene, trimethylene, 1-methyl-methylene, 1,1-dimethyl-methylene, 1-ethyl-dimethylene, 1-ethyl-1-methyl-dimethylene, tetramethylene, 1,1-dimethyl-ethylene, 1,1-dimethyl-propylene, 2,2-dimethyl-propylene, 1-ethyl-propylene, 2-ethyl-propylene, 2-methylbutylene, pentamethylene, hexamethylene, 2,2-dimethyl-butylene, 3,3-dimethyl-butylene, 2,2-dimethyl-butylene, or 1-ethyl-butylene, 2-ethyl-butylene.

$C_2$–$C_5$alkenylene can mean straight chain or branched alkenylene like, for instance, vinyl, allyl, methallyl, 1-methyl-2-butenyl or 2-butenyl.

$C_2$–$C_{24}$alkenyl means a $C_2$–$C_{24}$alkyl residue, for instance one mentioned above, which is once or several times unsaturated, it being possible that two or more than two double bonds are isolated or conjugated. Examples of $C_3$–$C_{24}$alkyl residues are in particular allyl, 2-propen-2-yl, 2-buten-1-yl, 3-buten-1-yl, 1,3-butadien-2-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl, or the different isomeric forms of hexenyl, octenyl, nonenyl, decenyl, dodecenyl, tetradecenyl, hexadecenyl, octadecenyl, eicosenyl, heneicosenyl, docosenyl, tetracosenyl, hexadienyl, octadienyl, nonadienyl, decadienyl, dodecadienyl, tetradecadienyl, hexadecadienyl, octadecadienyl, eicosadienyl, heneicosadienyl, docosadienyl or tetracosadienyl.

$C_2$–$C_{24}$alkinyl means a $C_3$–$C_{24}$alkyl or a $C_3$–$C_{24}$alkenyl residue, for instance one of those exemplified above, which additionally comprises one or several triple bonds which can be isolated or can be conjugated, either with each other or with one or more double bonds. Typical examples are 1-propin-3-yl, 1-butin-4-yl, 1-pentin-5-yl, 2-methyl-3-butin-2-yl, 1,4-pentadiin-3-yl, 1,3-pentadiin-5-yl, 1-hexin-6-yl, cis-3-methyl-2-penten-4-in-1-yl, trans-3-methyl-2-penten-4-in-1-yl, 1,3-hexadiin-5-yl, 1-octin-8-yl, 1-nonin-9-yl, 1-decin-10-yl or 1-tetracosin-24-yl.

$C_4$–$C_{12}$-cycloalkyl may be monocyclic cycloalkyl like, for instance, cyclobutyl, cyclopentyl, cyclohexyl, trimethylcyclohexyl or menthyl: or polycyclic cycloalkyl, like thujyl, bornyl, 1-adamantyl or 2-adamantyl.

$C_4$–$C_{12}$-cycloalkenyl means a, for instance one of those mentioned above, which additionally is once or several times unsaturated, it being possible that two or more than two double bonds are isolated or conjugated. Examples of $C_4$–$C_{12}$-cycloalkyl are 2-cyclobuten-1-yl, 2-cyclopenten-1-yl, 2-cyclohexen-1-yl, 3-cyclohexen-1-yl, 2,4-cyclohexadien-1-yl, 1-p-menthen -8-yl, 4(10)-thuien-10-yl, 2-norbornen-1-yl, 2,5-norbornadien-1-yl or 7,7-dimethyl-2, 4-norcaradien-3-yl.

$C_1$–$C_{12}$alkoxy means —O—$C_1$–$C_{12}$alkyl, preferably —O—$C_1$–$C_6$alkyl, in particular —O—$C_1$–$C_4$alkyl, wherein $C_1$–$C_{12}$alkyl, $C_1$–$C_6$alkyl and $C_1$–$C_4$alkyl have, for instance, one of the meanings indicated above, for instance $C_1$–$C_6$alkoxy like methoxy, ethoxy, n-propoxy, isopropoxy, n-butoxy, tert.-butoxy, n-amyloxy, tert.-amyloxy or n-hexyloxy.

$C_1$–$C_{12}$alkylthio means —S—$C_1$–$C_{12}$alkyl, preferably —S—$C_1$–$C_6$alkyl, in particular —S—$C_1$–$C_4$alkyl, wherein $C_1$–$C_{12}$alkyl, $C_1$–$C_6$alkyl and $C_1$–$C_4$alkyl have, for instance, one of the meanings indicated above.

$C_1$–$C_{12}$alkyl in one of the groups $(C_1$–$C_{12}$alkyl$)_2$N or $(C_1$–$C_{12}$alkyl)N may have one of the meanings exemplified above and means preferably $C_1$–$C_4$alkyl.

A halogen atom shall mean a monovalent fluoro, chloro, bromo or iodo residue in the above definition, preferably a chloro residue; whereas the term hydrogen atom stands for-H.

Most preferably, B is a group selected from those of the following formulae:

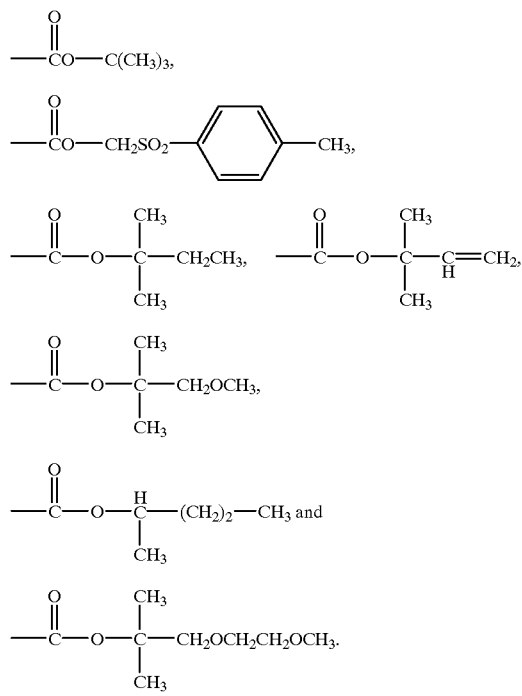

In particular, the compounds of formula (I) are selected from the group consisting of:

the perylene carboxylic acid imides of formula VIa and VIb:

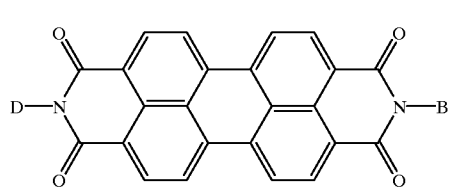

(VIa)

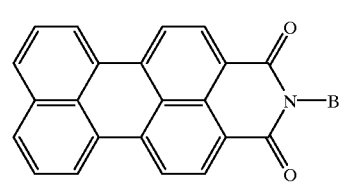

(VIb)

the quinacridones of formula VII and VIIa:

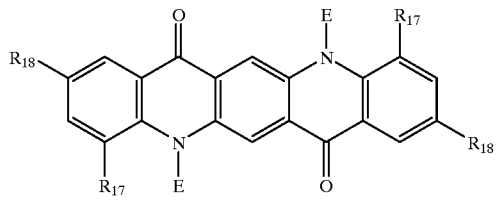

(VII)

(VIIa)

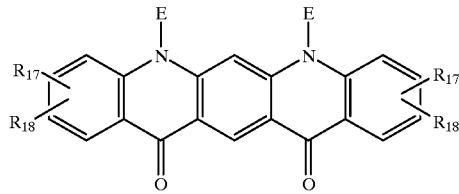

the dihydroquinacridones of formula VIIb:

(VIIb)

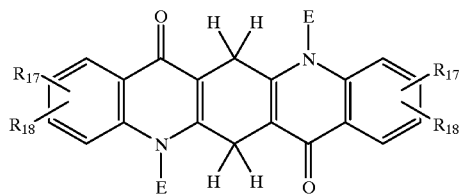

the quinacridonequinones of formula VIIc:

(VIIc)

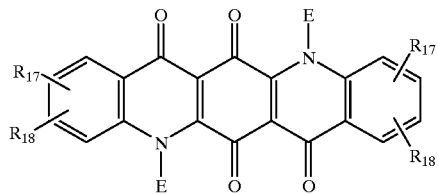

the pigment precursors of polycyclic chromophores having a molecular structure according to the formulae VIId, VIIe or VIIf:

(VIId)

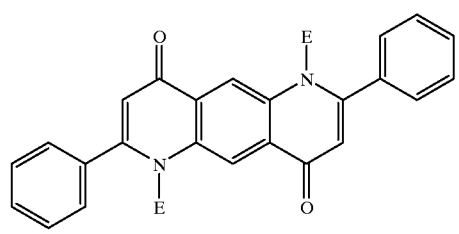

(VIIe)
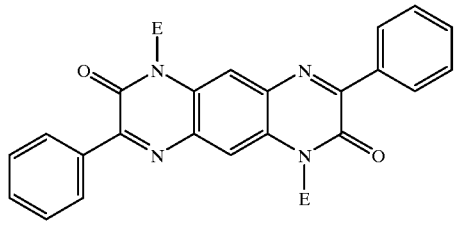
(VIIf)
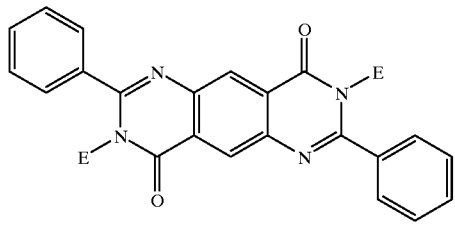
the quinophthalones of formula XL or XLI:
(XL)
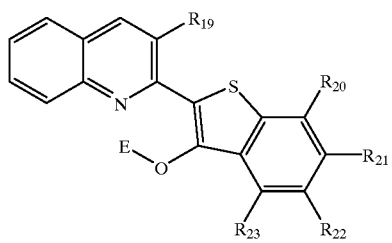
(XLI)
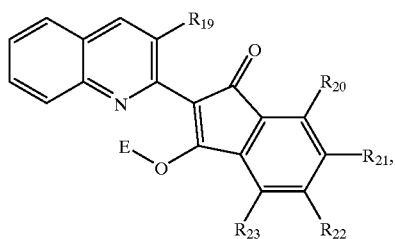
the dioxazines of formula VIII and IX:
(VIII)
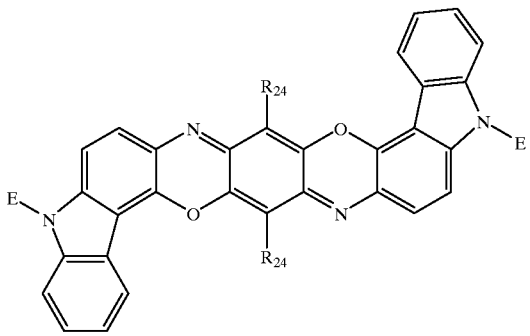
(IX)
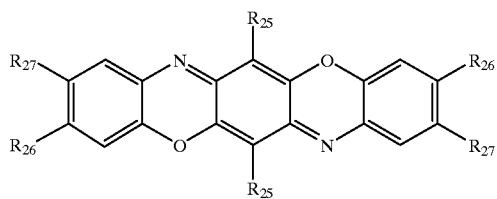
the isoindolines of formula X, XI and XII:
(X)
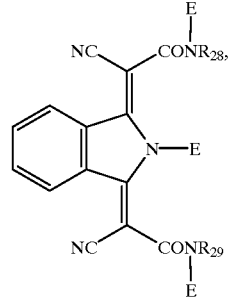
(XI)
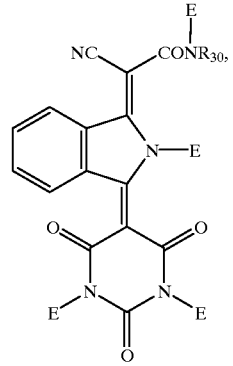
(XII)
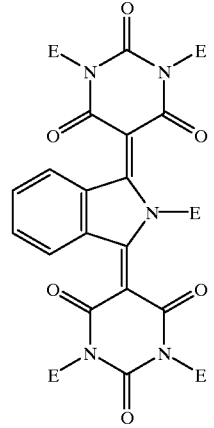

the isoindolinones of formula XIIIa, XIIIb or XIIIc:
(XIIIa)
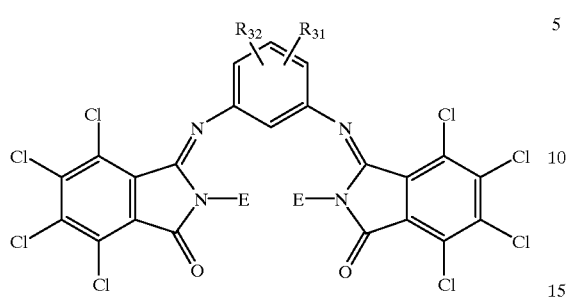
(XIIIb)
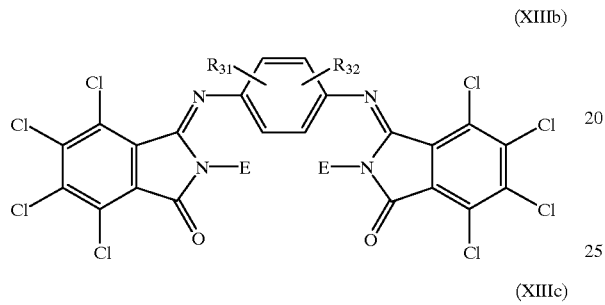
(XIIIc)
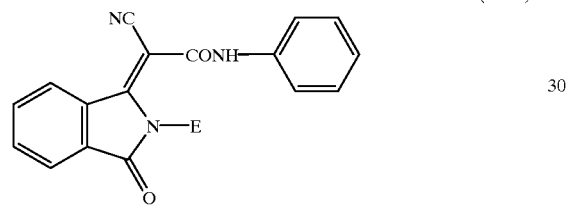
benzimidazolone aze compounds of formula XIVa, XIVb and XIVc:
(XIVa)
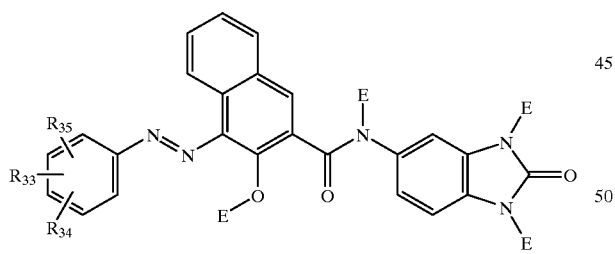
(XIVb)
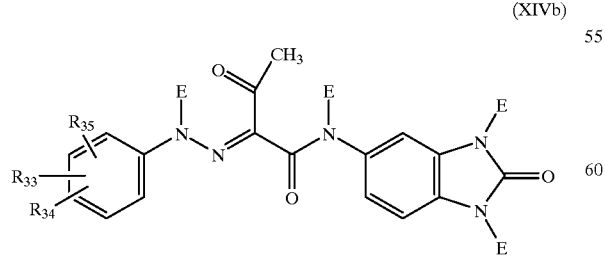
(XIVc)
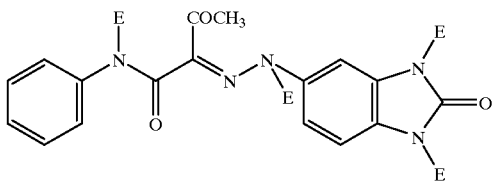
the indigo derivatives of formula XV:
(XV)
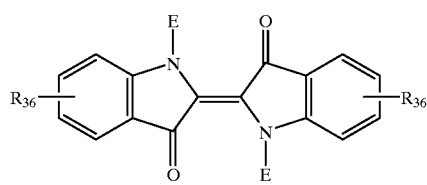
the monoazo compounds of formula XVIa, XVIb and XVIc:
(XVIa)
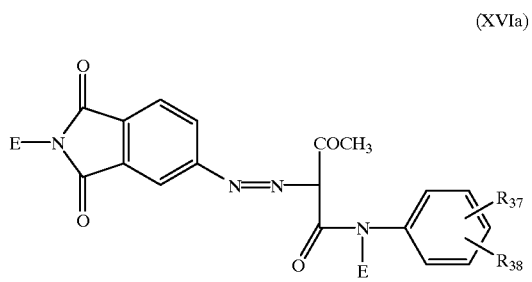
(XVIb)
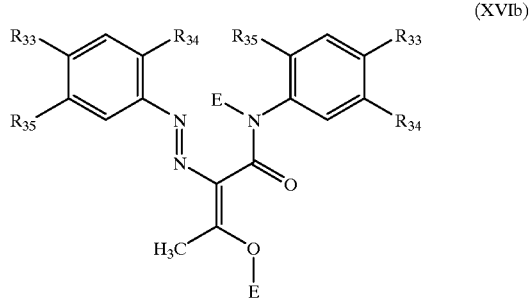
(XVIc)
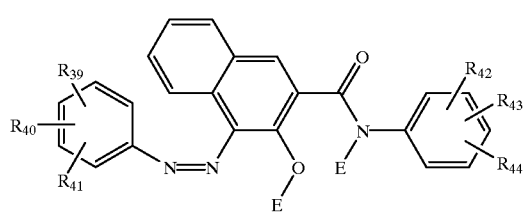

the compounds of formula XVId or XVIe:
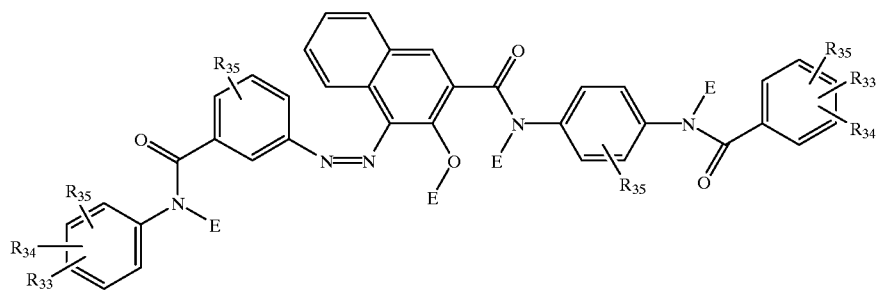
(XVId)
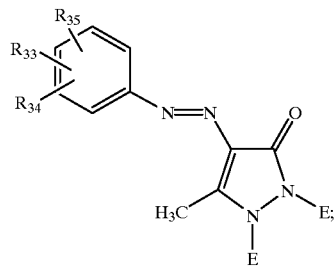
(XVIe)
the bisazo compounds of formula XVII, XVIII, XVIIIa, XVIIIb or XVIIIc:
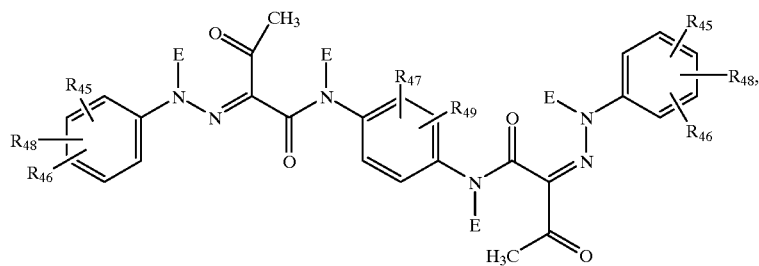
(XVII)
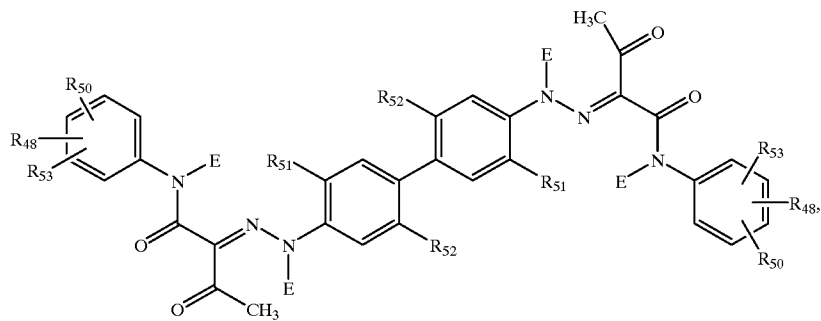
(XVIII)

-continued
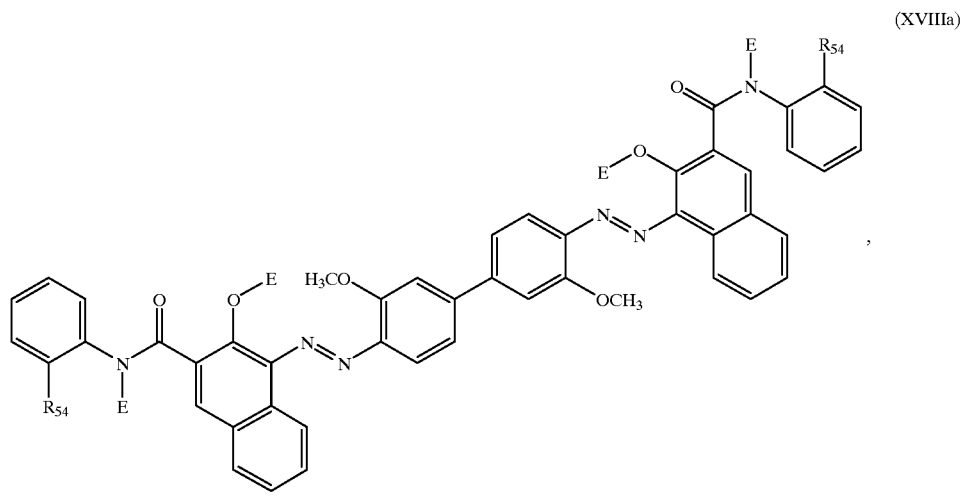
(XVIIIa)
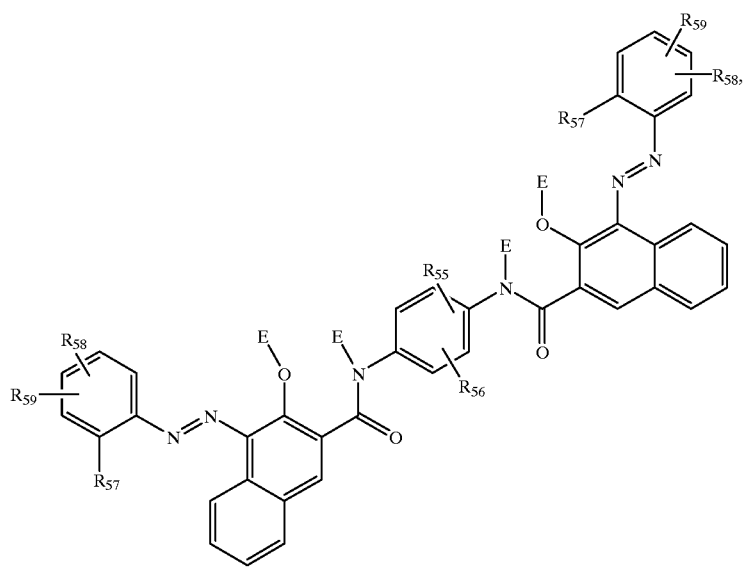
(XVIIIb)

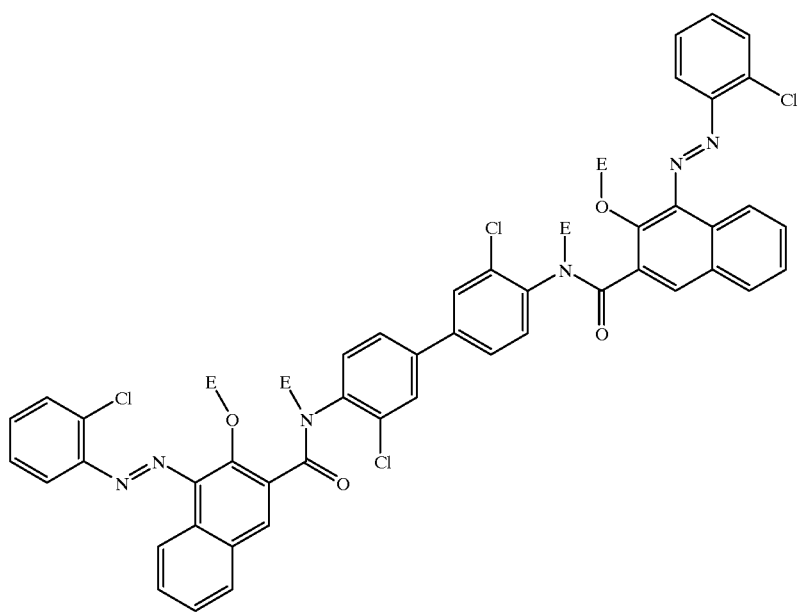
the anthraquinoic compounds of formula XIX, XIXa, XIXb, XIXc, XIXd and XX:
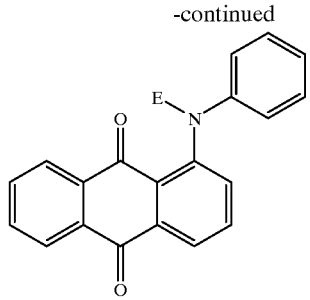
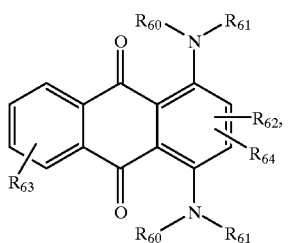
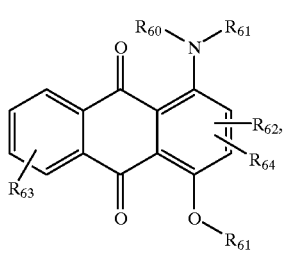
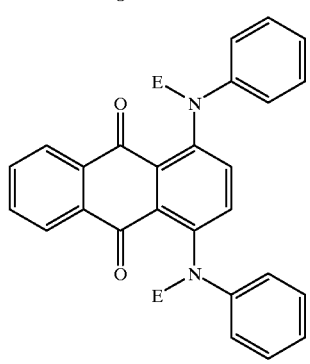
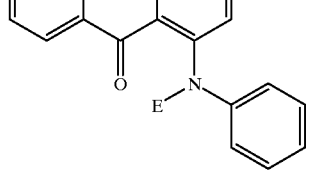
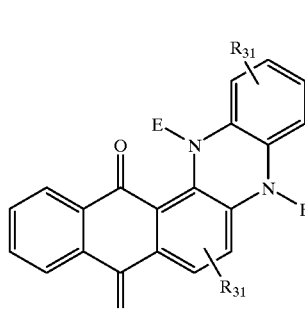
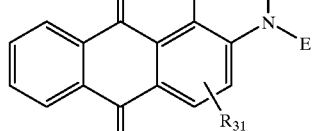

the phthalocyanines of formula XXIa and XXIb:

(XXIa)

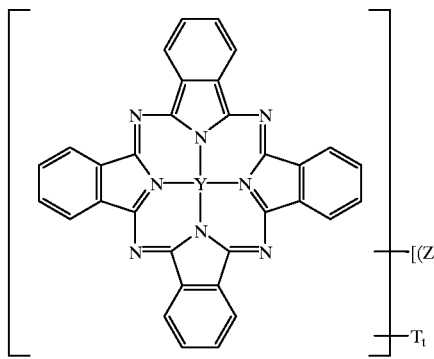
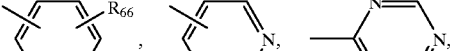

(XXIb)

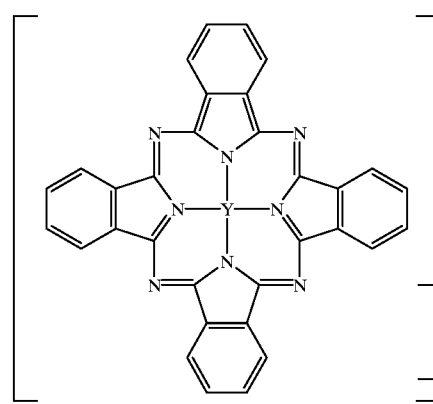

the pyrrolo[3,4-c]pyrroles of formula XXIIa and XXIIb:

(XXIIa)

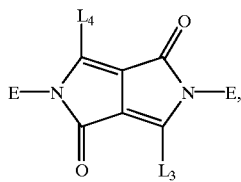

(XXIIb)

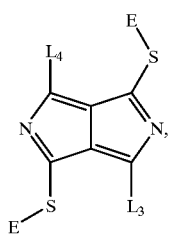

in which the symbols have the following meaning:
  arene$^1$ represents a mono- or divalent $C_6$–$C_{24}$-arene or $C_5$–$C_{24}$-heteroarene group, in particular phenyl, phenanthryl or naphthyl;
  B has one of the meanings as specified above,
  D represents a hydrogen atom; $C_1$–$C_6$alkyl; or one of phenyl, benzyl, phenethyl, which is unsubstituted or substituted by halogen or $C_1$–$C_6$alkyl; or has the meaning of B,
  E represents hydrogen atom or has one of the meanings of B,
  $L_4$ and $L_3$ each represent, independently from one another, a group of formula

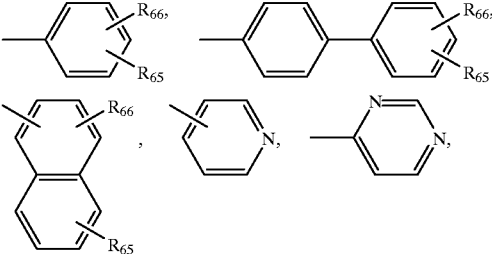
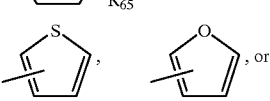
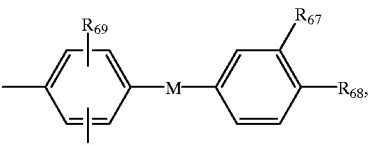

M represents a group of formula —$CH_2$—, —CH($CH_3$)—, —C($CH_3$)$_2$—, —CH=N—, —N=N—, —O—, —S—, —SO—, —$SO_2$— or —$NR_{71}$—,
$R_{17}$ and $R_{18}$ each represent, independently from one another, a hydrogen or halogen atom; $C_1$–$C_{24}$alkyl; $C_1$–$C_6$alkoxy or phenyl,
$R_{19}$ represents a hydrogen atom or a group of formula —O—E;
$R_{20}$, $R_{21}$, $R_{22}$ and $R_{23}$ each represent, independently from one another, a hydrogen or halogen atom; a group of formula —COO—$C_1$–$C_5$alkyl or —CONE—$C_1$–$C_6$alkyl;
$R_{24}$ represents a hydrogen or halogen atom; or $C_1$–$C_{24}$alkyl,
$R_{25}$, $R_{26}$ and $R_{27}$ each represent, independently from one another, a hydrogen or halogen atom; $C_1$–$C_4$alkyl; $C_1$–$C_4$alkoxy; a group of formula —NECO$C_1$–$C_4$alkyl, —NECO-phenyl or —NH—E, with the proviso that at least one of the residues $R_{25}$, $R_{26}$ or $R_{27}$ represents— NECO$C_1$–$C_4$alkyl, —NECO-phenyl or —NH—E,
$R_{28}$ represents a group of formula

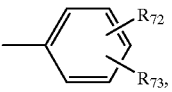

$R_{29}$ represents a hydrogen atom; $C_1$–$C_{24}$alkyl; benzyl or a group

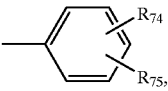

$R_{30}$ represents a hydrogen atom; or a group having the meaning of E or of $R_{28}$,
$R_{31}$ and $R_{32}$ each represent, independently from one another, a hydrogen or halogen atom;

or $C_1$–$C_6$alkyl, $R_{33}$, $R_{34}$ and $R_{35}$ each represent, independently form one another, a hydrogen or halogen atom; $C_1$–$C_6$alkoxy; $C_1$–$C_6$alkyl; trifluoromethyl; nitro; acetyl; —CONR$_9$R$_{76}$, —COOR$_9$, —COOH or —SO$_2$NR$_9$R$_{76}$, $R_{36}$ represents a hydrogen or halogen atom; cyano; $C_1$–$C_6$alkyl; $C_1$–$C_6$alkoxy;

$R_{37}$ and $R_{38}$ each represent, independently from one another, a hydrogen or halogen atom; $C_1$–$C_6$alkyl; $C_1$–$C_6$alkoxy; nitro; acetyl; or a group of formula —SO$_2$NE—$C_1$–$C_6$alkyl, $R_{39}$ has one of the meanings of $R_{35}$ or represents phenoxy or a group of formula —COO($C_1$–$C_6$alkyl), $R_{40}$ has one of the meanings of $R_{33}$ or represents a group of formula —NECO-phenyl; —NECO—$C_1$–$C_6$alkyl; or —CONE$_2$, $R_{41}$ has one of the meanings of $R_{34}$ or of $R_{76}$ or represents a group of formula —SO$_2$O-arene$^1$, —SO$_2$O-arene$^1$—NO$_2$, —SO$_2$O-arene$^1$—CO$_2$CH$_3$, —SO$_2$CH$_2$-arene$^1$, or a group of formula

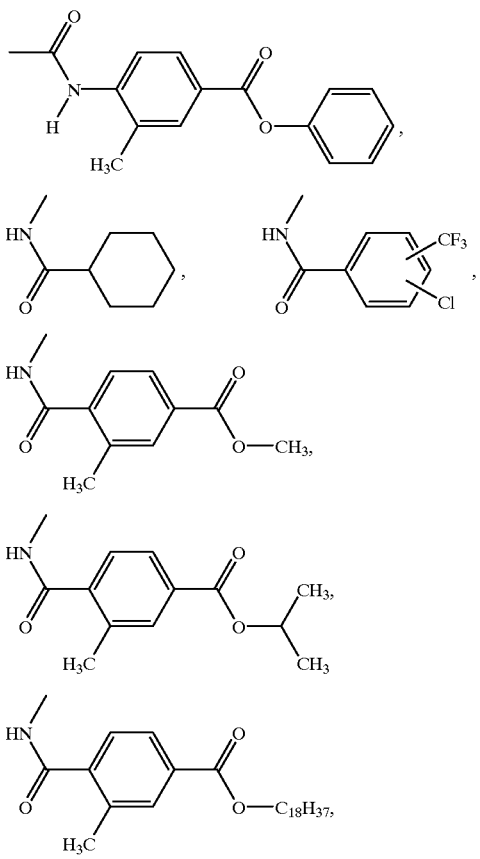

$R_{42}$ represents a hydrogen atom; $C_1$–$C_6$alkoxy; $C_1$–$C_6$alkyl or 1-naphthyl, $R_{43}$ represents a hydrogen or halogen atom; $C_1$–$C_6$alkoxy; $C_1$–$C_6$alkyl; nitro;

or has one of the meanings of $R_{40}$ or of $R_{41}$, or is a group of formula

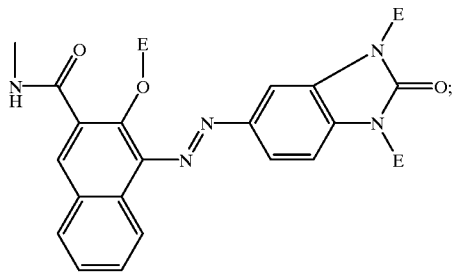

$R_{44}$ is a hydrogen atom; $C_1$–$C_6$alkoxy; $C_1$–$C_6$alkyl; a halogen atom or a group of formula —NECO—$C_1$–$C_6$alkyl; or —phenacyl which is unsubstituted or substituted by $C_1$–$C_6$alkyl, $C_1$–$C_6$alkoxy, once or preferably two or three times substituted by halogen; or a group of

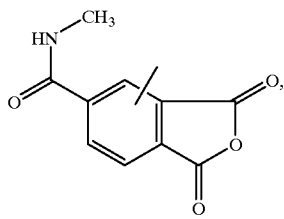

$R_{45}$ and $R_{46}$ each represent, independently from one another, a hydrogen or halogen atom; $C_1$–$C_6$alkoxy; $C_1$–$C_6$alkyl; trifluoromethyl; a group of formula —CONER$_{77}$ or —SO$_2$NER$_{77}$;

$R_{47}$ represents a hydrogen atom or halogen atom; nitro; $C_1$–$C_6$alkoxy or $C_1$–$C_6$alkyl, $R_{48}$, $R_{50}$ and $R_{53}$ each represent, independently from one another, a hydrogen or halogen atom; nitro; acetyl; $C_1$–$C_6$alkoxy; $C_1$–$C_6$alkyl; trifluoromethyl; or a group of formula —CONER$_{77}$ or —SO$_2$NER$_{77}$;

$R_{49}$ has one of the meanings of $R_{47}$, $R_{51}$, and $R_{52}$ each represent, independently from one another, a hydrogen or halogen atom; $C_1$–$C_6$alkoxy or $C_1$–$C_6$alkyl, $R_{54}$ is a hydrogen atom or methoxy, $R_{55}$ and $R_{56}$ each represent, independently from one another, a chloro atom or methyl, $R_{57}$, $R_{58}$ and $R_{59}$ each represent, independently form one another, a chloro atom; methyl or a group of formula —COOCH$_2$CH$_2$Cl or —COOCH(CH$_3$)$_2$, $R_{60}$ and $R_{61}$ each represent, independently from one another, a hydrogen atom; $C_1$–$C_{12}$alkyl, $C_6$–$C_{12}$-aryl which is unsubstituted or substituted by halogen, $C_1$–$C_6$alkyl, $C_1$–$C_6$alkoxy; nitro; acetyl; a group of formula —SO$_2$NEC$_1$–$C_6$alkyl or —SO$_2$NH$_2$, or represent a group having the meaning of E, $R_{62}$ and $R_{64}$ each represent, independently from one another, a hydrogen or halogen atom; $C_1$–$C_6$alkyl, $C_1$–$C_6$alkoxy, nitro, cyano, a group of formula —CONH$_2$, —SO$_2$NE—$C_1$–$C_6$alkyl, —SO$_2$NH$_2$, —SO$_3$H or —SO$_3$Na; or $C_6$–$C_{12}$-aryl which is unsubstituted or substituted by a halogen atom; $C_1$–$C_6$alkyl; $C_1$–$C_6$alkoxy; nitro; acetyl or a group of formula —SO$_2$NEC$_1$–$C_6$alkyl or —SO$_2$NH$_2$, $R_{63}$ means a hydrogen or halogen atom; nitro; cyano; hydroxyl or $C_1$–$C_6$alkoxy, $R_{65}$ and $R_{66}$ each represent, independently from one another, a hydrogen atom or halogen atom, $C_1$–$C_{24}$alkyl; $C_1$–$C_6$alkoxy; $C_1$–$C_{18}$alkylmercapto; $C_1$–$C_{18}$alkylamino; carbamoyl; cyano; $NO_2$; phenyl; trifluoromethyl; $C_5$–$C_6$-cycloalkyl;

a group of formula —C=N—($C_1$–$C_{24}$alkyl) or

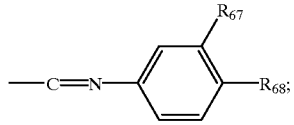

imidazolyl; pyrazolyl;
triazolyl; piperazinyl; pyrrolyl; oxazolyl; benzoxazolyl; benzthiazolyl; benzimidazolyl; morpholinyl; piperidinyl or pyrrolidinyl, $R_{67}$ and $R_{68}$ each represent, independently from one another, a hydrogen or halogen atom; $C_1$–$C_6$alkyl; $C_1$–$C_6$alkoxy or cyano, $R_{69}$ and $R_{70}$ each represent, independently from one another, a hydrogen or halogen atom; or $C_1$–$C_6$alkyl, $R_{71}$ represents a hydrogen atom or $C_1$–$C_6$alkyl, $R_{72}$, $R_{73}$, $R_{74}$ and $R_{75}$ each represent, independently from one another, a hydrogen or halogen atom; $C_1$–$C_{24}$alkyl; $C_1$–$C_6$alkoxy; or trifluoromethyl, $R_{76}$ represents a hydrogen or halogen atom; $C_1$–$C_6$alkyl; or phenyl which is unsubstituted or once or two or three times substituted by a halogen atom, nitro, a group having the meaning of E, —CONER$_{77}$, —NECO—R$_{77}$, trifluoromethyl, $C_1$–$C_6$alkoxy or $C_1$–$C_6$alkyl, $R_{77}$ represents a hydrogen atom or halogen; $C_1$–$C_4$alkyl; or phenyl, or represents naphthyl, biphenyl or oxybisphenyl, each of which is unsubstituted or substituted by 1 to 3, preferably by 2 substituents, each of the substituents being preferably selected from halogen, nitro, trifluoromethyl, $C_1$–$C_4$alkoxy, $C_1$–$C_4$alkyl or a group having the meaning of E, more preferably selected from Cl and methyl, $R_{78}$ represents a hydrogen atom, $C_1$–$C_6$alkyl, a group of formula —N(E)R$_{79}$, —NECOR$_{80}$, —SO$_2$(NH)$_2$CO$_2$C(CH$_3$)$_3$, —COR$_{80}$ or

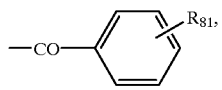

$R_{79}$ represents a hydrogen atom or $C_1$–$C_6$alkyl, $R_{80}$ represents $C_1$–$C_6$alkyl, $R_{81}$ represents a hydrogen or halogen atom; $C_1$–$C_6$alkyl or $C_1$–$C_6$alkoxy, T represents, independently for each T, Cl, Br or $C_1$–$C_{18}$alkoxy, t is 0 to 15, U represents a hydrogen atom or a residue having the meaning of W.

u is 0 if X' represents O or S, and is 1 if X' represents N,

W represents —$C_2$–$C_{12}$alkylene-NE$_2$—$C_2$–$C_{12}$alkylene-NHE, —$C_2$–$C_{12}$alkylene-OE or —$C_2$–$C_{12}$alkylene-OE, w is 1 to 4, X' represents a hetero atom, selected from N, O and S, Y represents $H_2$; a divalent metal selected from Ru(II), Rh(II), Pt(II), Mn(II), Mg(II), Be(II), Ca(II), Ba(II), Cd(II), Hg(II), Sn(II), Co(II) Pb(II) and preferably from Cu(II), Zn(II), Fe(II), Ni(II) and Pd(II); or a monovalent or divalent oxometal group of formula VO, MnO or TiO, y is 1 to 8, Z represents a group of formula —CH(R$_{79}$)—, —CO— or —SO$_2$—, and z is 0 or 1.

Symbols not found in the above list have the meaning specified earlier in this application.

Of the above pigment precursors those having the following formulae are particularly preferred: VIb, XLI, X, XIIIa, XIIIb, XIIIc, XIVa, XIVb, XIVc, XVIa, XVIb, XVIc, XVId, XVII, XVIII, XVIIIa, XVIIIb, XVIIIc and XXIa and XXIb.

The total content of the microbeads in pigment precursors may vary in wide ranges. The microbeads may, for example, comprise 0.5 to 50, preferably 1 to 35 percent, in particular 1 to 25 percent of one or more pigment precursors, this percentage being based on the total weight of thermoplastic polymers and the pigment precursors, which are distributed within the microbeads. A specific embodiment of microbeads according to the invention comprises 1 to 10 percent of pigment precursors, distributed in their mass, and is particularly suitable for the manufacture of toners for electrophotographic printing techniques and for ink jet printing, particularly if the average diameter of the microspheres is below 0.2 microns.

The microbeads may also comprise compounds other than the mentioned pigment precursors incorporated into the polymeric mass if these compounds do not impede the transformation of the pigment precursor into the respective pigment. These compounds include particularly additives which are usual in the specific field in which the microbeads are to be used. Examples of additives include charge control agents like 3-hydroxypicolinamide, Broensted acids, precursors of Broensted acids, plasticizers, surfactants and stabilizers. The total content of such further compounds in the microbeads may vary and depends particularly on the type of compound and the quantities in which such compounds are effective. In general, the microbeads will contain 0 to about 20 percent of additional compounds, based on the total weight of the polymers, pigment precursors and additional compounds of a microbead, preferably 1 to 10, most preferably 1 to 5 percent.

Though the microbeads of the instant invention can generally be produced by several different processes, two types of processes are particularly preferred for their production.

One type embraces the processes for preparing microbeads according to the invention wherein solid thermoplastic polymer microbeads are contacted with a solution, which is able to penetrate the microbeads without dissolving them and comprises one or more compound dissolved therein including at least one pigment precursor, for a time period which is at least long enough for the solution to fully penetrate the microbeads and wherein the one or more than one compound is precipitated thereafter from the absorbed solution inside of the microbeads. The invention also relates to particles, in particular to microbeads, obtainable by this process.

Those skilled in the art will be aware that the impact of a solvent may be influenced by the temperature of the solvent and will choose the temperature accordingly, in particular they will choose a temperature in a range at which swelling occurs at a significant rate but at which the microbeads do not dissolve or become irreversibly deformed.

Processes of this type can quickly be carried out and do not require specific or expensive equipment such as ball mills for carrying out a grinding or milling step. Moreover, the said types of processes are applicable to almost all conceivable types of polymer microbeads, and in particular to the manifold types of commercially available polymer microbeads. The microbeads can be homogeneously filled with the precursors of arbitrary organic pigments by applying this process; by simply contacting the microbeads for a sufficient and usually very short period of time with a solution of one or more than one compound comprising at least a pigment precursor of one or more desired pigments in a suitable solvent.

The microbeads, prior to contact with the solvent, may already comprise components other than the one or more thermoplastic polymers which may have also been conventionally incorporated into the microbeads, as long as these components do not hamper the process of the instant invention and are, in particular, not eluted from the polymeric material of the microbeads by the contacting solvents used during the process. Examples of such components include inorganic compounds, for example inorganic pigments like titanium dioxide and others.

Suitable solvents for preparing the solution of pigment precursors used for this process must not dissolve the polymeric material of the microbeads but must be able to penetrate it and to let it swell. Suitable solvents include in particular polar, aprotic organic solvents. Examples of suitable solvents comprise ethers like, for example, dioxane, dimethoxyethane or tetrahydrofurane, as well as esters like ethyl acetate, ketones like acetone, methylethylketone, 2-butanone, cyclohexanone, cyclopentanone, methylisobutylketone or chlorinated hydrocarbones like, for instance, chloroform, trichlorethane, chlorobenzenes, alcohols like 2-propanol, furthermore lactones or N,N'-dimethylformamide or dimethylsulfoxide or 2-pyrrolidone, N-methyl-2-pyrrolidone, N,N'-dimethylacetamide, and mixtures comprising one or more of these solvents. Particularly preferred solvents are dioxane, mixtures of dioxane and tetrahydr-ofurane and especially tetrahydrofurane alone.

The solvent is mixed with one or more pigment precursors and optionally also with one or more of further compounds which shall be incorporated into the microbeads before transformation of the precursors into the corresponding pigments. The suitable concentration of a certain component in the solution can vary in wide ranges. It depends for instance on the concentration in which the said component shall be incorporated into the microbeads and on the quantity of said solution which can penetrate the microbeads during the contact time. The greater, in general, the concentration of a certain component in the solution and the greater the quantity of solution absorbed by the microbeads during the contact time are, the greater the concentration of the microbeads in said component will be after the solvent has been removed again from the microbeads. Solutions comprising 1 to 30, in particular 1 to 10 percent by weight, of a pigment precursor can however be used in most cases. It should be noted in this relation that a solution of a certain concentration can, of course, be used to incorporate a greater concentration of the precursor into the microbeads than is dissolved in the solution itself if the polymeric material of the microbeads can absorb and is allowed to absorb more than its own weight of the solvent.

The time period over which the microbeads must be contacted with the solution depends mainly on the diameter of the microbeads, the type of polymers of which the microbeads consist and of the type of solvent used. Its lower limit corresponds to the time which the solution needs for fully penetrating the microbeads. In general, a contact time of 1 minute to five hours is sufficient for soaking microbeads of a diameter up to 1000 microns. Preferably the contact time ranges from 1 to 120 minutes, in particular from 1 to 20 minutes. The contact of the microbeads with the solution can be mechanically intensified, for instance by stirring.

When the microbeads have been contacted for a sufficient time with the solution comprising the one or more pigment precursors and the optional further compounds, the pigment precursors and the optional further compounds are precipitated from the solution absorbed inside of the microbeads.

The precipitation can be carried out, for instance, by adding a liquid to the microbeads, which can penetrate the swollen microbeads due to intermixing with the former carrier solvent without dissolving them and which renders the one or more than one compound dissolved in the solution which is absorbed inside of the microbeads substantially insoluble in the mixture of the solvent and the liquid formed inside of the microbeads by penetration of said liquid, and contacting the microbeads with said liquid for at least the time period which is necessary for the liquid to fully penetrate the interior of the microbeads, for example for 5 to 300 minutes, preferably for 60 to 180 minutes. Suitable liquids for carrying out the precipitation are miscible with the solution absorbed inside the microbeads and include in particular water and methanol and solvent mixtures comprising predominantly water in which the pigment precursors or the other compounds to be precipitated are substantially insoluble, and which mixes with the formerly used carrier solvent. This method has the advantage that pigment precursors and other compounds are generally precipitated very fast within the microbeads and in the form of particles of a very small size and in a very fine and uniform distribution.

The microbeads are preferably separated from non-absorbed solvent before the above precipitation is carried out. After the precipitation of the components dissolved in the solution the microbeads are preferably dried.

The precipitation can however also be carried out by simply drying the microbeads after having them contacted with the solution comprising the pigment precursor thereby evaporating and removing the solvent from their interior.

In both cases mentioned above drying is preferably carried out at elevated temperatures, though this is not necessary, for instance at 40 to 120° C. and preferably at 60 to 90° C., and optionally under reduced pressure. Depending on the drying conditions and on the targeted application, the latent pigment can be converted to the corresponding pigment during drying, or left in its latent form. Usual times for drying range from 1 hour to several days, preferably from 2 to 20 hours. The maximum temperature for drying must be lower than the lowest melting point of the polymeric material of the microbeads in order to avoid a softening of the microbeads and destruction of their spherical shape. The temperature for drying must evidently be lower than the temperature at which the pigment are transformed into the corresponding pigments if microbeads comprising the unreacted pigment precursors are to be produced.

As mentioned, it is possible to combine drying and re-pigmentation of the pigment precursors if the removal of the solvent is carried out by heating the microbeads to a temperature which is still below the melting point of the polymers they comprise, but which is high enough for the transformation of the pigment precursors into the corresponding pigments. Suitable temperatures for a re-pigmentation of the pigment precursors are mentioned below. If required, the temperature for re-pigmentation can be adjusted to be below the melting point of the beads by addition of catalytic amounts of strong Broensted acid catalyst.

The dried microbeads can also be exposed to the described process for a second time, for instance, if a different solvent is needed for one or some of the compounds to be incorporated into the microbeads. More than one repetitions of the process are also possible.

The microbeads according to the invention can also be prepared by a process wherein a solution which comprises the polymeric material of the microbeads in dissolved form and one or more compounds comprising at least a pigment precursor is spray-dried.

To carry out such a process one must prepare a solution comprising the polymer and the other components in a suitable solvent, in particular in one of the solvents mentioned above in relation with the first process. The solution preferably comprises the components in the ratio in which the microbeads shall comprise them. The total solids content of the solution lies preferably between 1 and 40, in particular between 3 and 20 percent by weight, and is one factor governing the size of the microbeads obtained which generally grows if the solids content of the solution is increased under otherwise identical conditions. This type of process is particularly suitable for the production of microbeads according to the invention having a rather small size, for instance, within the range of 1 to 20 microns.

Each of the usual and well-known devices for spray drying can be used for carrying out this process. A person skilled in the art of spray drying is able to adapt the process parameters to the requirements of a specific device in order to receive the desired microbeads on that device. One possibility for the preparation of microbeads according to this process, particularly on a laboratory scale, requires a conventional spray gun as used for spraying of paints by which the solution comprising the dissolved thermoplastic polymers and pigment precursors is sprayed over a certain distance within a ventilated hood with filter. The solvent is removed thereby and solid microbeads of an even globular shape are formed. The microbeads can be classified according to size, if desired, by collecting them through suitable filters.

The microbeads according to the invention can be heated to a temperature which is below the melting point of the polymers which they comprise in order to transform the pigment precursors into the respective insoluble pigments. The temperatures necessary for carrying out said transformation by use of heat only lie generally in the range of 100 to 250° C., and must be applied for a time period of usually 1 minute to 24 hours. The higher the temperature, the shorter the time period must be.

It is also possible and is preferred to contact the microbeads with a suitable Broensted acid to cause the re-pigmentation of the pigment precursors because the presence of a Broensted acid strongly reduces the temperatures required for transforming a pigment precursor into the pigment. The temperature and time period necessary for the transformation depend primarily on the acid strength of Broensted acid. If for instance a Broensted acid of a $pK_a$ in the range of about 1 to 2 is used, the transformation can generally be carried out at ambient temperatures of, for instance, 15 to 35° C., and in course of rather short times ranging from a minute to some hours, for example from 1 to 120 minutes. Even times between 1 and 10 minutes are sufficient in most cases. Weaker Broensted acids may, on the other hand, require longer times, for instance in the range of a few minutes to 5 five days, preferably 5 minutes to 24 hours. Elevated temperatures may, of course, also be used in presence of Broensted acids as long as the do not surpass the glass transition temperature of the polymeric material.

The Broensted acid must be in liquid form so that it can entirely penetrate the microbeads during the contact. In liquid form means that either the Broensted acid itself is liquid under the conditions, especially at the temperature, at which contacting is carried out or that it must be brought into a liquidized form prior to the contact by forming a solution thereof which is able to penetrate the polymeric material of the microbeads entirely during the contact without dissolving the polymers. Suitable solvents for dissolving the Broensted acid include all the solvents already mentioned above, for example acetone. The Broensted acid is preferably dissolved in the solvent in an amount that the solution has a pH value of 2 or lower, for example about 1 to 1.5. The Broensted acid can also be added to the solution comprising the pigment precursor prior to precipitation, if the re-pigmentation is to be performed at an elevated temperature of e.g. 60–140° C.

Aliphatic carboxylic acids and sulfonic acids, in particular perhalogenated and most preferably perfluorated aliphatic carboxylic and sulfonic acids like trifluoroacetic acid or trifluoromethane sulfonic acid may, for example, be used as Broensted acid for carrying out the re-pigmentation.

It is also within the scope of the invention that the thermoplastic polymers of the microbeads contain Broensted acid groups as pendant moieties, such as carboxylic acid groups, for instance, poly-hydroxystyrenes or poly(meth) acrylic acids. These Broensted acid groups lower also the temperature for re-pigmentation in comparison to a corresponding polymer without these groups depending on the concentration and the $pK_a$ of the functional Broensted acid groups.

The Broensted acid functions as a catalyst for the re-pigmentation. The presence of catalytic amounts of Broensted acid within the microbeads is accordingly sufficient for carrying out the re-pigmentation. Higher Broensted acid concentrations may, however, also be used althought negative side effects on the microbeads or in applications thereof cannot be excludede if very high a concentration is chosen. Generally, suitable Broensted acid concentrations within the microbeads may range from 0.01 to 500% by weight, preferably from 1 to 20% by weight, based on the weight of the pigment precursor.

After re-pigmentation of the pigment precursors of the microbeads the Broensted acid is preferably removed again from the microbeads, by treating the microbeads, preferably several times, with a pure solvent suitable to dissolve the Broensted acid but not the microbeads. Suitable solvents include the solvents mentioned above, for example acetone. This procedure is particularly advantageous if a liquid Broensted acid has been used. Finally, the microbeads are dried under conditions such as those described above.

A further embodiment of the invention is therefore a pigmented microbead comprising one or more than one polymers, submicron sized organic pigments (particle size $\leq 1$ $\mu$m) and optionally one or more further compounds which is obtained from a thermoplastic microbead which has distributed throughout the polymers one or more compounds which are pigment precursors, the melting temperature of the lowest-melting polymer of the microbead being at least higher than the lowest temperature required to transform all pigment precursors distributed within the microbeads into the respective pigments, in particular by heating it to a temperature which is below the melting point of the polymers but high enough to transform the pigment precursors into the respective pigments, or by contacting said latent-pigmented polymer microbeads with a Broensted acid in liquid form and wherein the transformation of the pigment precursors to the corresponding pigments is carried out in presence of said Broensted acid.

The pigmented microbeads prepared according to the above invention can be used in every field of technology where conventionally produced pigmented microbeads are applicable, for instance, for the production of inks, in particular for ink jet printing, lubricants, paints, cosmetics or as pharmaceutical carriers, and particularly as color toners for electrophotographic printing techniques.

The invention therefore also relates to a color toner for electrophotographic printing techniques comprising pigmented microbeads according to the invention, and to an ink for ink jet printing comprising pigmented microbeads according to the invention.

EXAMPLE 1

Pigmentation of microbeads of an average diameter of 74–149 μm (100–200 mesh) and consisting of a copolymer of polystyrene (99%) and divinylbenzene (1 %). A solution is made by dissolving 2.0 g of 3,6-bis-(4-chloro-phenyl)-1,4-dioxo-1H, 4H-pyrrolo[3,4-c]pyrrole-2,5-dicarboxylic acid bis-(1,1-dimethyl-propyl) ester of the following formula in 20 ml THF:

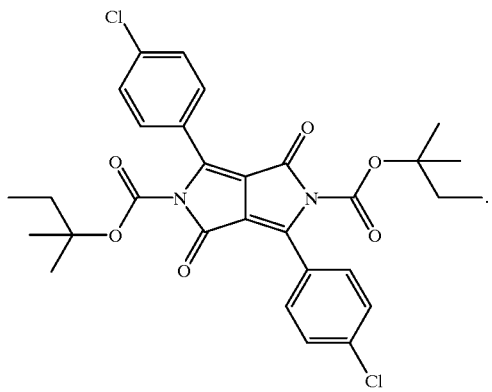

To this solution, 4.0 g microbeads (commercially available from Acros Organics, New Jersey/USA) are added. The resulting slurry is stirred at room temperature for 10 minutes until all of the solution is being absorbed by the microbeads. Then 200 ml of water are added. After stirring for 2 hours at ambient temperature the orange beads are isolated by filtration through a paper filter from the substantially colorless filtrate and are dried at 120° C. for 10 hours, leaving behind deeply red colored beads. Microtome cuts reveal that pigmentation is achieved throughout the whole diameter of the beads. The total pigment concentration in the microbeads is approximately 25%.

EXAMPLE 2

Pigmentation of microbeads of an average diameter of 100–200 mesh (0.074–0.149 mm) and consisting of a copolymer of polystyrene (99%) and divinylbenzene (1%). The procedure of example 1 is repeated. However, only 0.125 g of 3,6-bis-(4-chloro-phenyl)-1,4-dioxo-1H, 4H-pyrrolo[3,4-c]pyrrole-2,5-dicarboxylic acid bis-(1,1-dimethyl-propyl) ester is dissolved in THF. After drying for 10 h at 120° C. pigmented beads of a bright red color are obtained.

EXAMPLE 3

Incorporation of a solubilized pigment precursor in microbeads of an average diameter of 100–200 mesh (0.074–0.149 mm) and consisting of a copolymer of polystyrene (99%) and divinylbenzene (1 %).

The procedure of example 1 is repeated. However, the final drying step is performed at 80° C. for 10 hours, leaving behind orange colored microspheres.

EXAMPLE 4

Pigmentation of polyethylene microbeads (8 μm) 2.0 g of 3,6-bis-(4-chloro-phenyl)-1,4-dioxo-1H,4H-pyrrolo[3,4-c]pyrrole-2,5-dicarboxylic acid bis-(1,1-dimethyl-propyl) ester are dessolved in 20 ml THF. To this solution are added 20 g of FLO-Beads LE 1080® (a commercial product from Sumitomo Seika, average particle size 8.4 μm; melting point (DSC): 107° C.). After 15 minutes, the slurry is filtered through a paper filter, and the wet orange filtrate is transferred to a solution of 30 drops trifluoromethane sulfonic acid (pH 1) in 20 ml acetone. The slurry is stirred at room temperature for 15 minutes and filtered through paper filter. The resulting filtrate is washed 5 times with acetone and air-dried, yielding 20.5 grams of a bright red, very fine powder. Micrographs show that the original shape of the beads was unaffected by the pigmentation procedure. Microtome cuts reveal a pigmentation throughout the diameter of the beads.

EXAMPLE 5

The procedure of Example 4 is repeated. However, the wet orange filtrate is transferred to 30 ml of trifluoro acetic acid (pH 1.5) and stirred for 15 minutes at room temperature. The same colored fine powder is obtained as in example 4.

EXAMPLE 6

The procedure of Example 5 is repeated. However, solubilized Pigment Yellow 93 prepared according to example 6 of WO 98/45757 are used, yielding 19.7 g of a fine yellow powder.

EXAMPLE 7

Incorporation of additional compounds into pigmented microbeads. The procedure of Example 5 is repeated. The resulting red powder from Example 5 is mixed with a solution of 0.5 g 3-hydroxypicolinamide (a charge control agent) in 20 ml THF. After 30 min the slurry is filtered through a filter paper and air dried.

EXAMPLE 8

Preparation of microbeads containing solubilized pigment precursor by spray-drying.

A solution of 1.5 g of 3,6-bis-(4-chloro-phenyl)-1,4-dioxo-1H,4H-pyrrolo[3,4-c]pyrrole-2,5-dicarboxylic acid bis-(1,1-dimethyl-propyl) ester and 48.5 g poly(styrene) (Aldrich, $M_w$=45000) in 950 ml THF is sprayed in a ventilated hood using a conventional paint gun. After a flight distance of about 2 meters, the solids are collected trough a dust filter. The average diameter of the resulting yellowish microbeads is measured to be between 5–10 μm, determined by optical microscopy.

EXAMPLE 9

The procedure of example 8 is repeated. However, only 450 ml THF are used. The resulting yellowish beads have average diameters between 15–20 μm.

EXAMPLE 10

0.5 g beads containing the solubilized pigment precursor from example 8 are stirred in 5 ml of trifluoro acetic acid for 24 hours. Thereby a color change from yellow to red occurs. As soon as all solubilized latent pigment is converted to insoluble pigment (may be checked with acetone), the beads are isolated by paper filtration and rinsed 5 times with 15 ml acetone.

What is claimed is:

1. A process for preparing a pigmented microbead comprising a polymer, an organic pigment of particle size $\leq 1$ μm and optionally one or more further compounds wherein a microbead that comprises a thermoplastic polymer or a mixture of thermoplastic polymers and a pigment precursor or a mixture of pigment precursors throughout distributed therein, the melting temperature of the lowest-melting polymer of the microbead being higher than the lowest temperature required to transform all pigment precursors within the microbeads into the respective pigments is contacted with a Broensted acid in liquid form and wherein the transformation of the pigment precursors to the corresponding in pigments is carried out in presence of said Broensted acid.

2. A process according to claim 1, wherein the transformation of the pigment precursors is carried out at a temperature of from 15 to 35° C.

3. A process according to claim 2, wherein the Broensted acid is removed again from the microbeads after transformation of the pigment precursors to the corresponding pigments.

4. A color toner for electrophotographic printing techniques comprising a microbead prepared according to claim 1.

5. An ink for ink jet printing comprising a microbead prepared according to claim 1.

* * * * *